(12) United States Patent
Satoh

(10) Patent No.: US 8,960,921 B2
(45) Date of Patent: Feb. 24, 2015

(54) COMMUNICATION APPARATUS, COMMUNICATION SYSTEM, COMMUNICATION CONTROL METHOD, AND RECORDING MEDIUM STORING COMMUNICATION CONTROL PROGRAM

(75) Inventor: Jun Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 13/604,958

(22) Filed: Sep. 6, 2012

(65) Prior Publication Data
US 2013/0070210 A1 Mar. 21, 2013

(30) Foreign Application Priority Data
Sep. 16, 2011 (JP) ................................. 2011-202705

(51) Int. Cl.
| | |
|---|---|
| G03B 21/16 | (2006.01) |
| G05D 23/00 | (2006.01) |
| G06F 1/00 | (2006.01) |
| G06F 1/20 | (2006.01) |
| G06F 13/00 | (2006.01) |
| G06F 1/32 | (2006.01) |
| G03B 7/26 | (2006.01) |
| H04N 9/31 | (2006.01) |
| G06F 9/44 | (2006.01) |
| G06F 9/48 | (2006.01) |

(52) U.S. Cl.
CPC .... G06F 1/20 (2013.01); G06F 13/00 (2013.01); G06F 1/329 (2013.01); G03B 21/16 (2013.01); G03B 7/26 (2013.01); H04N 9/3144 (2013.01); G06F 9/442 (2013.01); G06F 9/4843 (2013.01)
USPC ............ 353/52; 700/300; 713/300; 713/310; 713/340

(58) Field of Classification Search
CPC ........... G06F 13/00; G06F 1/20; G06F 1/329; G06F 1/206; G03B 21/16; G03B 7/26; G05B 2219/15081
USPC ............. 353/52, 122; 700/300; 713/300, 310, 713/340
See application file for complete search history.

(56) References Cited

U.S. PATENT DOCUMENTS

| | | | |
|---|---|---|---|
| 2002/0147932 A1* | 10/2002 | Brock et al. .................. | 713/300 |
| 2005/0268126 A1* | 12/2005 | Lee .............................. | 713/300 |
| 2006/0156041 A1* | 7/2006 | Zaretsky et al. ............. | 713/300 |

FOREIGN PATENT DOCUMENTS

JP      2004-030625      1/2004

* cited by examiner

Primary Examiner — Georgia Y Epps
Assistant Examiner — Magda Cruz
(74) Attorney, Agent, or Firm — Oblon, Spivak, McClelland, Maier & Neustadt, L.L.P.

(57) ABSTRACT

A communication apparatus performs specific operation before turning off the power of the communication apparatus. When a request for communication task is detected, the communication apparatus determines whether execution of the communication task can be extended at a later time. When execution of the communication task can be extended, the communication apparatus extends execution of the communication task to a later time. When an instruction for turning off the power of the communication apparatus is received, the communication apparatus executes the requested communication task while performing the specific operation.

13 Claims, 7 Drawing Sheets

| COMMUNICATION TASK NAME | EXECUTION TIME EXTENSION FLAG |
|---|---|
| PERIODIC NOTICE DATA | T (TRUE) |
| AUTOMATIC ERROR NOTICE DATA | F (FALSE) |
| : | : |

| COMMUNICATION TASK NAME | WEIGHT (LOW 1 – HIGH 100) |
|---|---|
| PERIODIC NOTICE DATA | 50 |
| AUTOMATIC ERROR NOTICE DATA | 3 |
| : | : |

| COMMUNICATION TASK NAME | TASK PRIORITY (LOW1 – HIGH 10) |
|---|---|
| PERIODIC NOTICE DATA 1 | 5 |
| PERIODIC NOTICE DATA 2 | 9 |
| : | : |

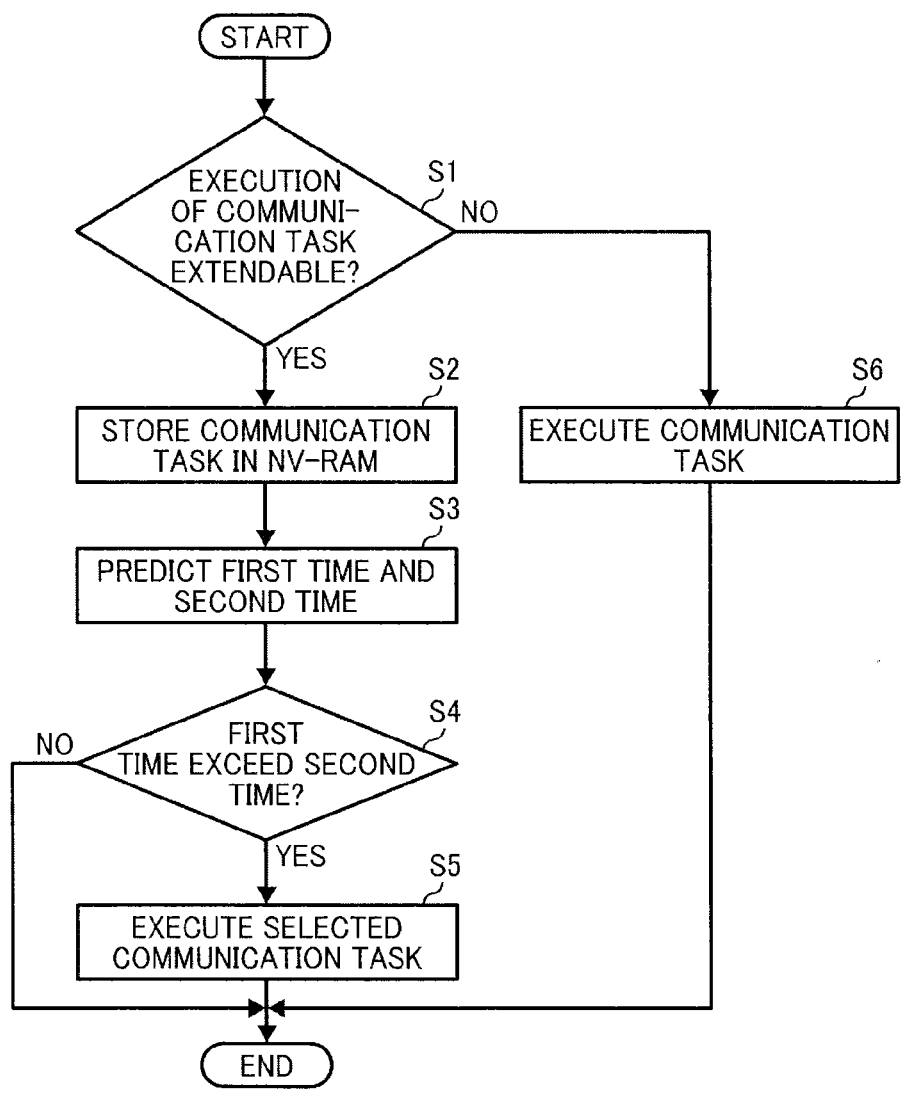

COMMUNICATION APPARATUS, COMMUNICATION SYSTEM, COMMUNICATION CONTROL METHOD, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application No. 2011-202705, filed on Sep. 16, 2011, in the Japan Patent Office, the entire disclosure of which is hereby incorporated herein by reference.

BACKGROUND

1. Field

The present invention generally relates to a communication apparatus, communication system, communication control method, and communication control program stored in a recording medium, and more specifically to an apparatus, system, method, and control program stored in a recording medium each of which manages execution of a communication task.

2. Background

Japanese Patent Application Publication No. 2004-30625 discloses a remote communication management system in which various communication apparatuses on a network are managed using a management apparatus. As one example of the communication apparatus to be managed by the management apparatus, a projector apparatus having the communicating function may be provided such that an image may be projected through the projector apparatus. In order to communicate with the other apparatuses on the network, the projector apparatus executes one or more communication tasks, for example, during the activation process or the projection process. This, however, tends to slow down the activation or projection process, as the projector apparatus needs to additionally process the communication tasks while performing the activation or projection process.

SUMMARY

In view of the above, there is a need for a projector apparatus capable of communicating with the outside apparatus, while reducing the workload on the projector apparatus in processing the communication tasks during the activation or projection process. The inventor of the present invention has realized that, it usually takes a certain time period, such as about one minute and half, for the projector apparatus to turn off its power when a user instruction for turning off the power is received. This is because a lamp in the projector apparatus needs to be cool down, before electronic power supply is shut down. Further, during the cooling process, the projector apparatus is not usually performing any other processing. Based on these findings, the inventor of the present invention has realized that the workload on the projector apparatus in processing the communication tasks during the activation or projection process may be reduced, if the communication tasks that are usually performed during the activation or projection process are later performed during the cooling process.

According to one aspect of the present invention, a communication apparatus that performs specific operation before turning off its power is provided. When a request for communication task is detected, a processor of the communication apparatus determines whether execution of the communication task can be extended at a later time. When it is determined that execution of the communication task can be extended, the processor of the communication apparatus stores the communication task in a memory to be executed later. When an instruction for turning off the power of the communication apparatus is received, the processor of the communication apparatus executes the communication task being stored while performing the specific operation.

According to one aspect of the present invention, when it is determined that execution of the communication task can be extended, the processor of the communication apparatus further determines whether the execution of the communication task can be completed while performing the specific operation. When it is determined that the execution of the communication task can be completed during the specific operation, the processor of the communication apparatus stores the communication task in the memory to be executed later.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a flowchart illustrating operation of processing a communication task, performed by the projector of FIG. 1, according to an example embodiment of the present invention;

Figure 1:
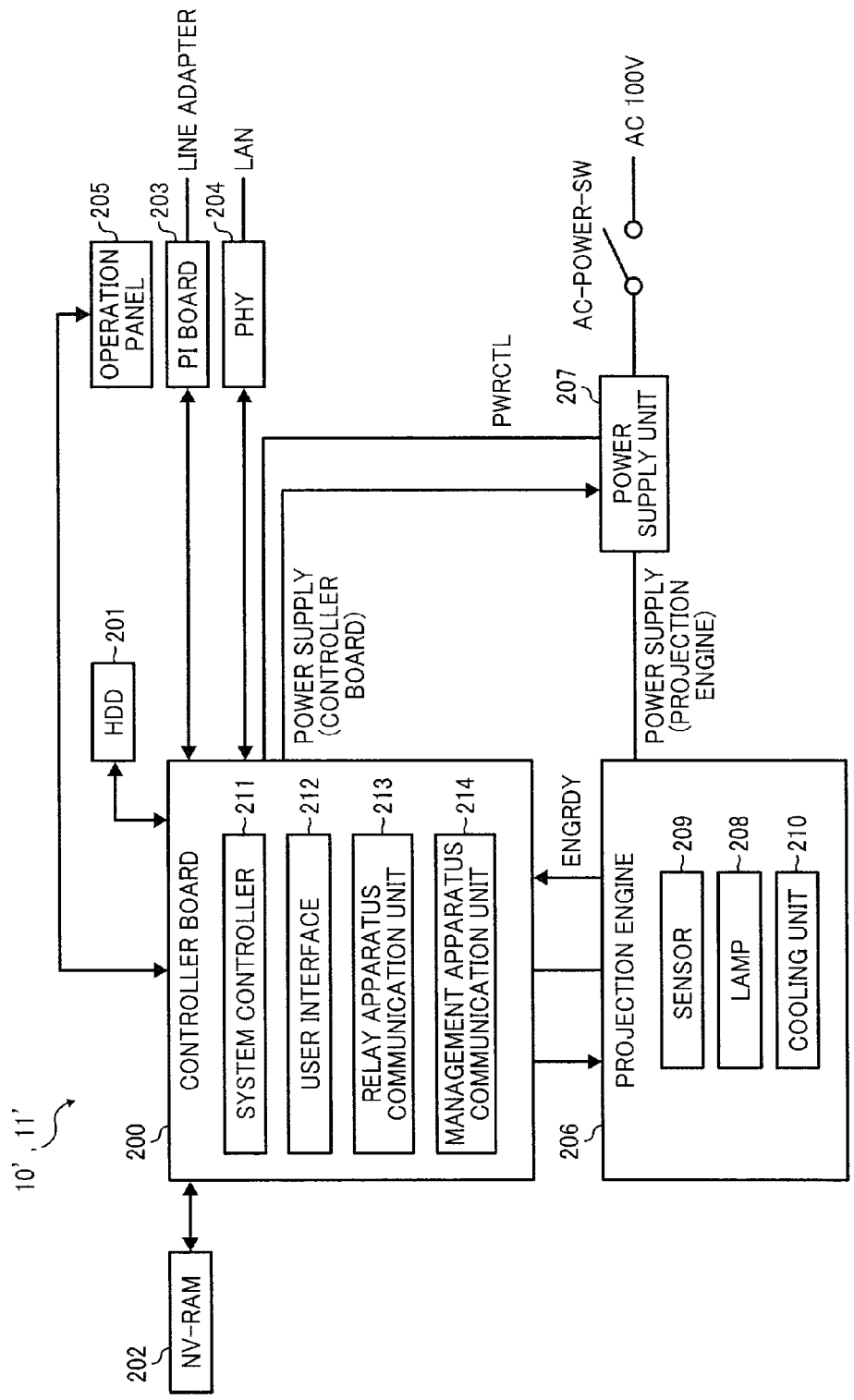
FIG. 1 is a schematic block diagram illustrating a hardware structure of a projector and a functional structure of a controller board of the projector, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 9, an apparatus, system, method, and control program stored in a recording medium each of which manages execution of a communication task are explained according to example embodiments of the present invention.

Figure 2:
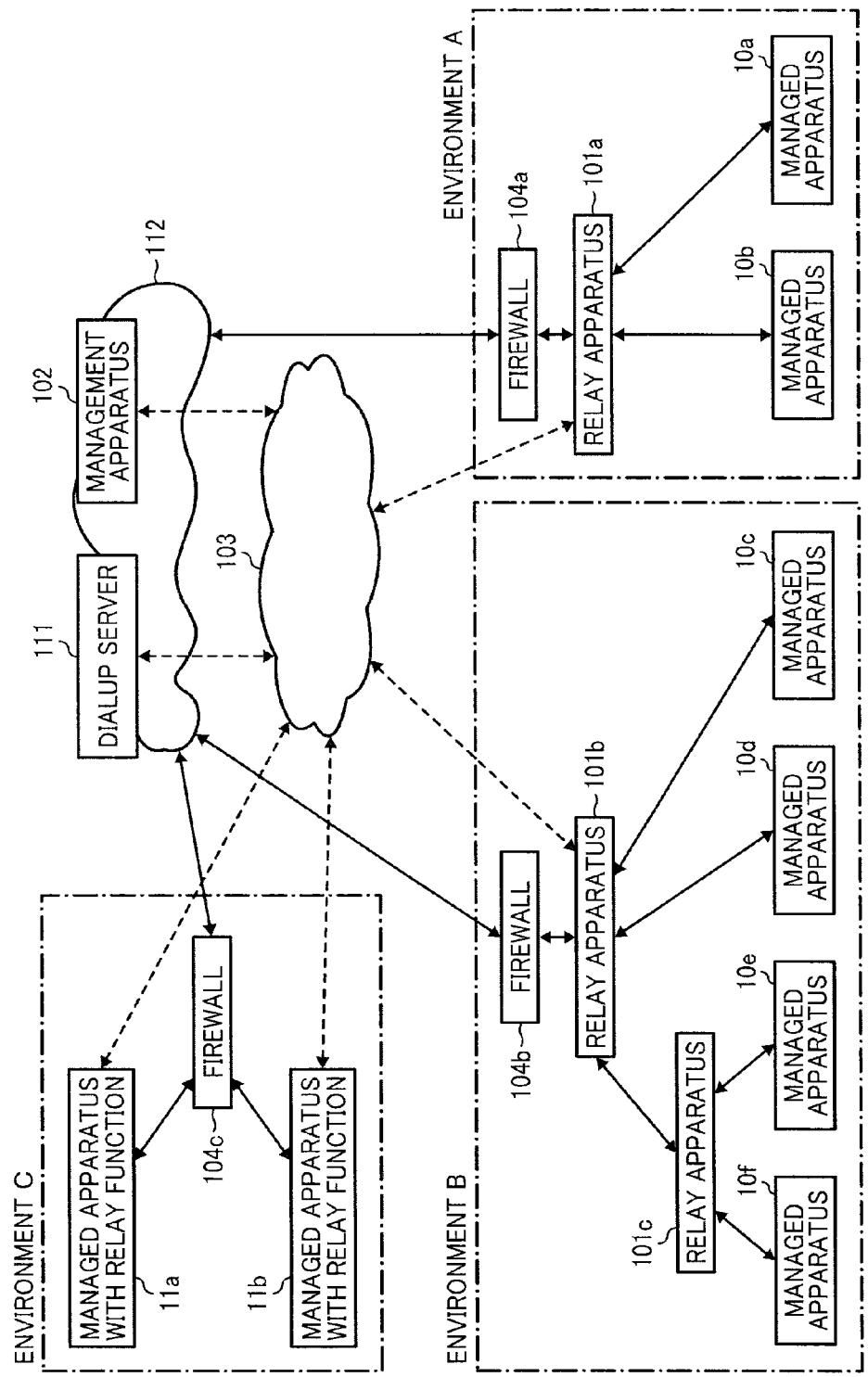
FIG. 2 is an illustration of an example configuration of a remote communication management system including the projector of FIG. 1.

FIG. 2 illustrates an example configuration of a remote communication management system, according to an example embodiment of the present invention.

The communication management system of FIG. 2 includes a management apparatus 102, a plurality of communication apparatuses 10a to 10f, 11a and 11b, and a plurality of relay apparatuses 101a, 101b, and 101c. In this example, the communication apparatuses 10a to 10f, which may be collectively referred to as the communication apparatus 10, are not provided with the relay function. The communication apparatuses 11a and 11b, which may be collectively referred to as the communication apparatus 11, are each provided with the relay function. Since the management apparatus 102 remotely manages the communication apparatus 10 and the communication apparatus 11, the communication apparatus 10 and the communication apparatus 11 may be respectively referred to as the managed apparatus 10 and the managed apparatus 11.

The managed apparatuses 10 and 11 may be implemented by an electronic apparatus provided with a communication function such as a projector, an image processing apparatus such as a printer, a facsimile, a digital copier, a scanner, or a multifunctional peripheral (MFP), a network electronic home appliance, a vending machine, a medical equipment, an electronic power supply device, an air conditioning system, and a utility metering system for gas, water, or electricity, etc.

The managed apparatus 10, which is not provided with the relay function, communicates with the management apparatus 102 via at least one of the plurality of relay apparatuses 101a to 101c (collectively referred to as the "relay apparatus 101") through a network. The relay apparatus 101 is connected to the managed device 10 via a local area network (LAN), and relays communications between the managed apparatus 10 and the management apparatus 102 through a public line 103 and/or the Internet 112. For example, the relay apparatus 101 is installed with application program, which provides the function of controlling the managed apparatus 10. Examples of the public line 103 include, but not limited to, any desired analog or digital telephone line such as ADSL, ISDN or optical fiber, a mobile telephone network, or a PHS.

The management apparatus 102, which functions as a server in the communication management system, centrally manages the managed apparatus 10 through the relay apparatus 101. For example, the management apparatus 102 is installed with application program, which provides the function of managing the managed apparatus 10 through the relay apparatus 101. Depending on user environments, the relay apparatus 101 and the managed apparatus 10 are implemented in various layout structures. For example, in the user environment A of FIG. 2, the relay apparatus 101a, which establishes direct connection with the management apparatus 102 based on Hyper Text Transfer Protocol (HTTP), relays communications between the management apparatus 102 and the managed apparatuses 10a and 10b.

In the user environment B of FIG. 2, in order to manage a large number of managed apparatuses 10, more than one relay apparatus 101 is provided. More specifically, the relay apparatus 101b, which establishes direct connection with the management apparatus 102 based on HTTP, relays communication between the management apparatus 102, and the managed apparatuses 10c and 10d and the relay apparatus 101c. The relay apparatus 101c relays communications between the relay apparatus 101b and the managed apparatuses 10e and 10f. In such case, any data transmitted from the management apparatus 102 for the managed apparatuses 10e and 10f is transferred to the managed apparatuses 10e and 10f via the relay apparatus 101b and the relay apparatus 101c.

In the user environment C of FIG. 2, the managed apparatus 11 provided with the relay function communicates with the management apparatus 102 through the public network 103 and/or the Internet 112. More specifically, the managed apparatus 11 is provided with a relay device that functions as the relay apparatus 101 such that the managed apparatus 11 can communicate with the management apparatus 102 without the relay apparatus 101. In alternative to previously installing the relay device in the managed apparatus 11, application or program modules may be installed onto the hardware resources of the managed apparatus 10, such as a CPU, ROM, or RAM, to cause the managed apparatus 10 to have the relay function of the relay apparatus 101.

Although not shown in FIG. 2, the managed apparatus 10 having no relay function may be further connected to the managed apparatus 11 having the relay function so that the managed apparatus 10 may communicate with the management apparatus 102 using the relay function of the managed apparatus 11.

The remote connection management system of FIG. 2 further includes a dialup server 111, which may be implemented by a relay apparatus that relays communications between the management apparatus 102 and the relay apparatus 101 or between the management apparatus 102 and the managed apparatus 11, through the public line 103 and/or the Internet 112. Further, in this example, in alternative or in addition to the public line 103, a leased line may be used.

For example, the dialup server 111 receives a communication request for the management apparatus 102, from the relay apparatus 101 or the managed apparatus 11 ("request apparatus"), and exchanges information relating to communication via the public line 103 between the management apparatus 102 and the request apparatus so as to establish connection between the management apparatus 102 and the request apparatus through the public line 103 and/or the Internet 112.

Further, as illustrated in FIG. 2, in the user environments A, B, and C, firewalls 104a, 104b, and 104c (collectively referred to as the "firewall 104") are respectively provided to improve the security. The firewall 104 may be implemented by a proxy server.

As described above, the relay apparatus 101 is installed with the application program, which provides the function of controlling the managed apparatus 10. The management apparatus 102 is installed with the application program, which provides the function of managing the managed apparatus 10 through the relay apparatus 101 or the managed apparatus 11. Each node in the communication management system such as the managed apparatus 10 transmits a request for processing a method of application, and receives a response including the processing result of the request, by remote procedure call (RPC).

More specifically, the relay apparatus 101, the managed apparatus 10 connected to the relay apparatus 101, or the managed apparatus 11 ("request apparatus") generates a request for the management apparatus 102, transmits the request to the management apparatus 102, and obtains a response including the processing result of the request from the management apparatus 102. The management apparatus 102 generates a request for the relay apparatus 101, the managed apparatus 10, or the managed apparatus 11, transmits the request to the relay apparatus 101 or the managed apparatus 11, and obtains a response including the processing result of the request. In case the request is addressed to the managed apparatus 10, the request is sent via the relay apparatus 101 to the managed apparatus 10, and received via the relay apparatus 101 from the managed apparatus 10.

PRC may be implemented by using any desired protocol (communication standards), technology, or specification such as Simple Object Access Protocol (SOAP), HTTP, File Transfer Protocol (FTP), Component Object Model (COM), Common Object Request Broker Architecture (CORBA), etc.

Now, transmission or reception of data between the management apparatus 102 and the managed apparatus 10 is explained according to an example embodiment of the present invention.

In one example, it is assumed that a request for the management apparatus 102 is generated at the managed apparatus 10. In such case, the managed apparatus 10 generates a request, and sends the request to the management apparatus 102 via the relay apparatus 101. The management apparatus 102 transmits a response including the processing result of the request to the managed apparatus 10 via the relay apparatus 101. As described above referring to the environment B of FIG. 2, more than one relay apparatus 101 may be involved in relaying communications between the managed apparatus 10 and the management apparatus 102.

In this example case, the management apparatus 102 may respond with notification indicating delay in response. For example, when the management apparatus 102 determines that a response in response to the request received from the managed apparatus 10 cannot be returned in a timely manner, the management apparatus 102 may transmit response delay notification to the managed apparatus 10, and disconnect from the managed apparatus 10. The response to the request is returned to the managed apparatus 10 when the management apparatus 102 is connected to the managed apparatus 10.

In one example, it is assumed that a request for the managed apparatus 10 is generated at the management apparatus 102. In such case, the management apparatus 102 generates a request, and sends the request to the managed apparatus 10 via the relay apparatus 101. The managed apparatus 10 transmits a response including the processing result of the request to the management apparatus 102 via the relay apparatus 101. The managed apparatus 10 may respond with delay response notification, when the managed apparatus 10 determines that a response in response to the request received from the management apparatus 102 cannot be returned in a timely manner.

For the descriptive purposes, in the following examples, the managed apparatus 10 without the relay function, and the managed apparatus 11 with the relay function, may be collectively referred to as the managed apparatus 10(11).

Figure 3:
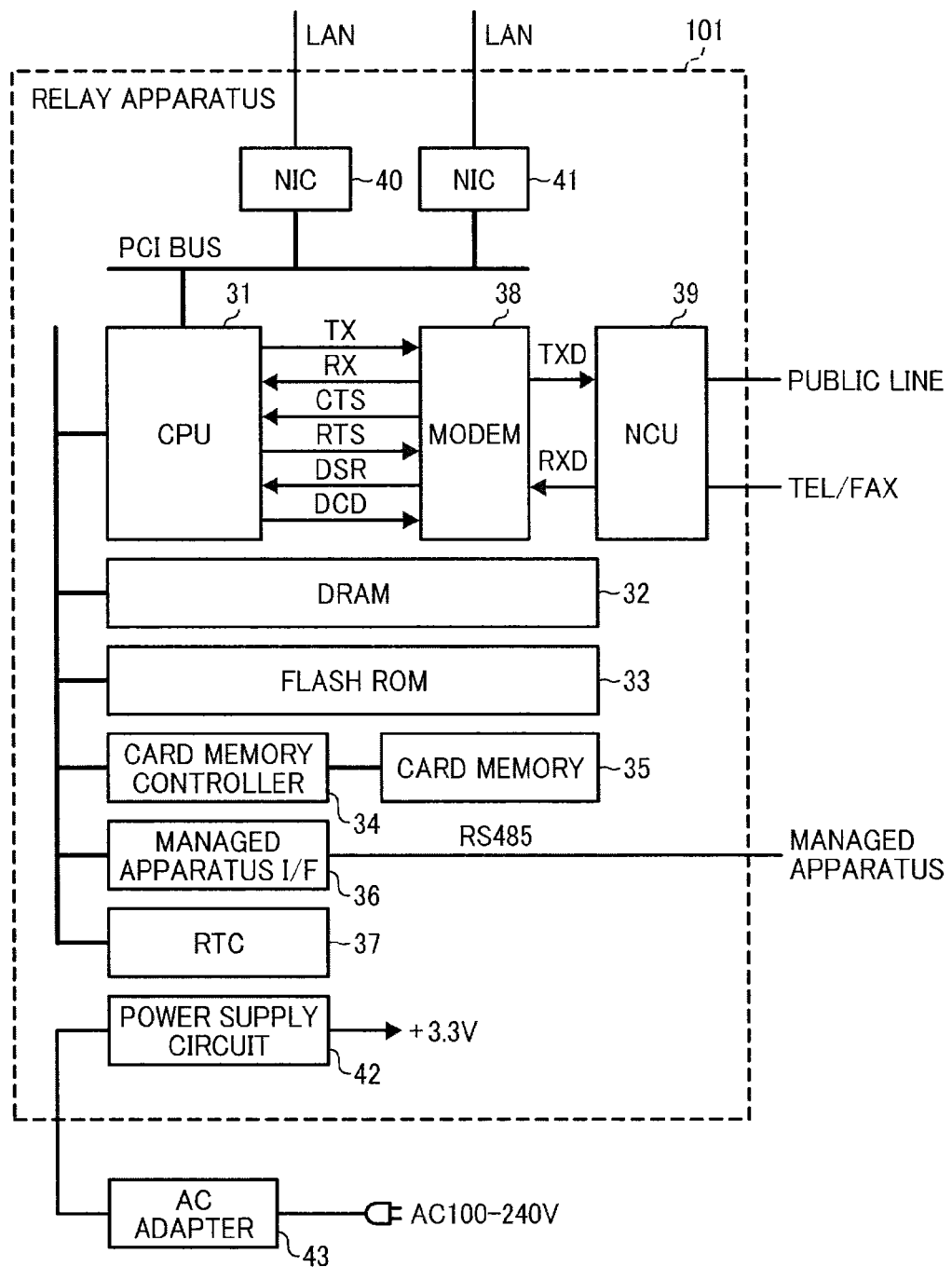
FIG. 3 is a schematic block diagram illustrating a hardware structure of a relay apparatus of the communication management system of FIG. 2, according to an example embodiment of the present invention.

Referring now to FIG. 3, a hardware structure of the relay apparatus 101 is explained according to an example embodiment of the present invention.

The relay apparatus 101 includes a CPU 31, a DRAM 32, a flash ROM 33, a card memory controller 34, a card memory 35, a managed apparatus I/F 36, a real time clock (RTC) circuit 37, a modem 38, a network control unit (NCU) 39, network interface circuits (NICs) 40 and 41, and a power supply circuit 42.

The CPU 31 is a processor such as a central processing unit, which controls entire operation of the relay apparatus 101. More specifically, the CPU 31 controls operation of the managed apparatus 10 connected to the relay apparatus 101, based on various control programs including the operating system (OS) that are stored in the DRAM 32. The CPU 31 controls transmission or reception of various data (or signals) with respect to the management apparatus 102, using the NCU 39 or the NIC 40 or 41, through the public line 103 and/or a network such as the Internet 112 or the LAN.

The CPU 31 calls the management apparatus 102 through such as the public line 103, and controls switching of a line with respect to the outside apparatus, for example, by controlling the time to switch the line with respect to the managed apparatus 10. For example, based on data received from the managed apparatus 10, the CPU 31 of the relay apparatus 101 determines whether to connect with the managed apparatus 10, or connect with the other communication device or apparatus through a telephone or facsimile (TEL/FAX) line.

The DRAM 32 functions as a main memory such as a program memory that stores therein various control programs such as the OS, and a work memory to be used for data processing by the CPU 31.

The flash ROM 33 is implemented by a nonvolatile memory, which may function as a program memory that stores the boot program, and a database (DB) that stores various data such that data is not deleted even after the power of the relay apparatus 101 is turned off. Examples of various data to be stored include, but not limited to, data to be exchanged between the management apparatus 102 and the managed apparatus 10, notification periodically received from the managed apparatus 10 such as periodic notice data addressed to the management apparatus 102, and various other information such as error notification that is automatically transmitted from the managed apparatus 10 when an error is detected such as automatic error notice data addressed to the management apparatus 102. In alternative to the flash ROM 33, any desired nonvolatile memory may be used such as EEPROM.

The card memory controller 34 controls writing or reading of various data with respect to the card memory 35. The card memory 35 is implemented by a nonvolatile memory such as a SD memory, which stores various programs such as the OS, drivers, and application programs. Alternatively, the programs may be stored in the flash ROM 33, or a HDD that may be additionally provided to the relay apparatus 101.

The managed apparatus I/F 36 allows the relay apparatus 101 to connect with the managed apparatus 10.

The RTC circuit 37 generates time information. Based on the time information, the CPU 31 is able to obtain a current date and time.

The modem 38 modulates data to be transmitted to the management apparatus 102 via the public line 103 such that the modulated data is compatible with the public line 103. The modem 38 demodulates data received from the managed apparatus 102 for further processing by the relay apparatus 101.

The NCU 39 controls communications with the outside apparatus such as the management apparatus 102 or the outside communication device or apparatus such as a telephone device or a facsimile device through the telephone/facsimile (TEL/FAX) line.

The NICs 40 and 41 each control communications with the other electronic apparatus on the LAN such as the managed apparatus 10, the firewall 104, or a computer. Further, the NICs 40 and 41 each control communications with the other electronic apparatus provided outside the LAN, such as the management apparatus 102 disposed outside the LAN.

The power supply circuit 42 converts alternate current (AC) power supply obtained from an AC adaptor 43 to direct current (DC) power supply to provide electric power to each device or unit in the relay apparatus 101.

In this example, the modem 38 and the CPU 31 are connected through signal lines for transmission data (TX), reception data (RX), transmission capability signal (CTS), transmission request signal (RTS), data set ready signal (DSR), and carrier detection signal (DCD). The CPU 31 controls the modem 38 based on the transmission request signal (RTS) and the carrier detection signal (DCD).

The NCU 39 and the modem 38 are connection through signal lines for reception data (RXD) and transmission data (TXD). The reception data (RXD) is an analog signal modulated by a modem of the management apparatus 102. The transmission data (TXD) is an analog signal modulated by the modem 38 of the relay apparatus 101.

When the power is turned on as electric power is supplied from the power supply circuit 42, the CPU 31 executes the boot program on the flash ROM 33 to control the card memory controller 34 to read various control programs such as the OS from the card memory 35, and installs the read programs onto the program memory of the DRAM 32. The CPU 31 performs operation according to the read programs, for example, by selectively using the RTC circuit 37, modem 38, NCU 39, NIC 40, or NIC 41.

Figures 4, 5A, 5B, 5C:
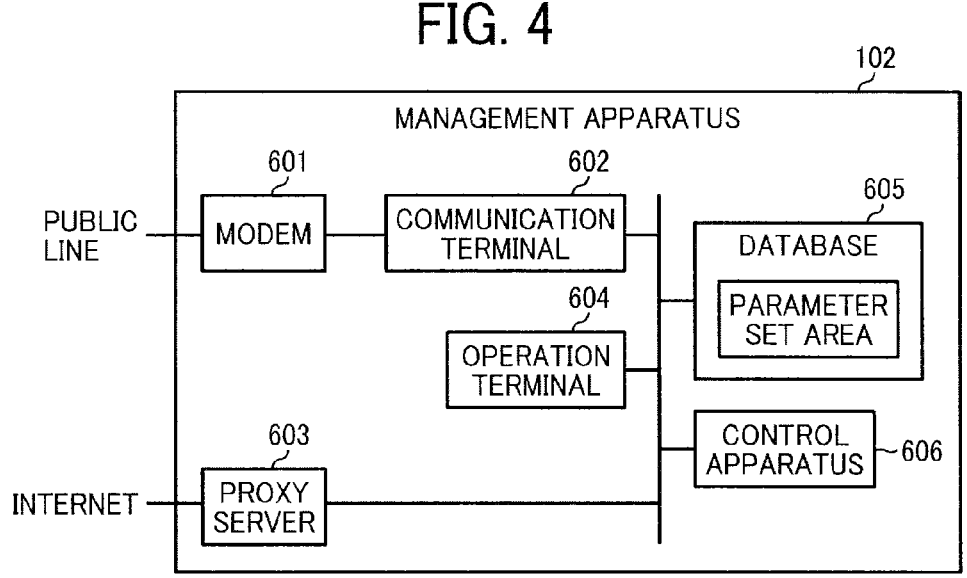
FIG. 4 is a schematic block diagram illustrating a hardware structure of a management apparatus of the communication management system of FIG. 2, according to an example embodiment of the present invention.
FIG. 5A is an example data structure of a table storing information indicating whether execution of a communication task can be extended, referred to by the projector of FIG. 1.
FIG. 5B is an example data structure of a table storing information indicating a workload in processing a communication task, referred to by the projector of FIG. 1.
FIG. 5C is an example data structure of a table storing information indicating a priority level of a communication task, referred to by the projector of FIG. 1.

Referring now to FIG. 4, a hardware structure of the management apparatus 102 is explained according to an example embodiment of the present invention. The management apparatus 102 includes a modem 601, a communication terminal 602, a proxy server 603, an operation terminal 604, a database 605, and a control apparatus 606.

The modem 601 communicates with the relay apparatus 101 connected to the managed apparatus 10, or the managed apparatus 11 through the public line 103. The modem 601 modulates data for transmission or demodulates data that is received from the outside apparatus. The communication terminal 602 controls communications with the outside apparatus using the modem 601.

The proxy server 603 manages communication or security with the relay apparatus 101 connected to the managed apparatus 10, or the managed apparatus 11, through the Internet 112.

The operation terminal 604 receives a user instruction, which may be input through an input device such as a keyboard or a pointing device such as a mouse.

The database 605 may be implemented by any desired storage device such as a hard disk device. In this example, the database 605 stores various data received from the managed apparatus 10 via the relay apparatus 101 or the managed apparatus 11. Examples of data include, but not limited to, notification that is periodically received from the managed apparatus 10(11) such as periodic notice data, various other information such as error notification that is automatically transmitted from the managed apparatus 10(11) when an error is detected such as automatic error notice data, data input through the operation terminal 604, or other data or programs. The database 605 includes a parameter set area, which is located at a predetermined memory space area and stores information regarding various parameter values such as parameter value relating to the network or the communication line.

The control apparatus 606 is provided with a microcomputer including a CPU, ROM, and RAM, and controls entire operation of the management apparatus 102. The CPU of the control apparatus 606 operates according to various control programs, and selectively uses the modem 601, the communication terminal 603, or the proxy server 603 to execute various functions.

The information regarding parameter values, which are stored in the parameter set area of the database 605, may be partly stored in the flash ROM 33 of the relay apparatus 101. Examples of the information regarding parameter values include, but not limited to, server information, proxy information, managed apparatus information, and network environment information.

The server information may indicate an IP address of the relay apparatus 101, default gateway address, availability of dynamic host configuration protocol (DHCP), subnet mask, simple mail transfer protocol (SMTP) server name, email address of the management apparatus 102, or SMTP address and password. The proxy information may indicate a proxy IP address or a proxy address.

The managed apparatus information (managed apparatus parameters) may include any information related to the managed apparatus 10(11) that may be confidential, such as an IP address of the managed apparatus 10(11), or a machine type number of the managed apparatus 10(11). The managed apparatus information is transmitted from the managed apparatus 10(11) to the management apparatus 102, directly or via the relay apparatus 101, through the public line 103. In case the managed information is transmitted via the relay apparatus 101, the managed apparatus information may be inputted to the relay apparatus 101 through an operation terminal such as a CE terminal or a user terminal. Alternatively, the CPU 31 of the relay apparatus 101 may obtain the managed apparatus information from the managed apparatus 10, and writes the obtained information in the flash ROM 33.

The network environment information (network environment parameters) is any information related to network environments including confidential information, and may indicate a proxy authentication key, polling mode based on HTTP, polling cycle time for the management apparatus 102 during normal operation, polling cycle time for the management apparatus 102 when an error is detected, line type information such as PPP information indicating push button (PB) or dial pulse (DP), a number of polling times or a polling time period for the management apparatus 102.

The network environment information may additionally or alternatively indicate a route specifying whether proxy is used or point to point protocol (PPP) is used, an IP address of the management apparatus 102, authentication key of the relay apparatus 101, uniform resource locator (URL) of the relay apparatus 101, port number, timeout information, periodic notice cycle time, telephone number of the management apparatus 102, telephone number of the relay apparatus 101, dialup authentication key of the relay apparatus 101 for the management apparatus 102, or dialup authentication key of the management apparatus 102 for the relay apparatus 101.

The network environment information is transmitted from the management apparatus 102 through the public line 103 to the relay apparatus 101. The management apparatus 102 may previously store the network environment information in the parameter set area of the database 605. Alternatively, the management apparatus 102 obtains the network environment information through the operation terminal 604, and stores the obtained information in the parameter set area of the database 605.

The CPU 31 of the relay apparatus 101 obtains periodic notification information ("periodic notice data") that is periodically received from the managed apparatus 10, or error notification information ("automatic error notice data") that is automatically generated by the managed apparatus 10, by DHCP or SNMP, and writes the obtained information in the flash ROM 33. When the network environment information is received through a user input to an operation terminal, the CPU 31 of the relay apparatus 101 writes the network environment information in the flash ROM 33.

In this example, dynamic host configuration protocol (DHCP) is a protocol, which automatically assigns an IP address to a computer that connects the Internet 112 at least temporarily. The "protocol" is a collection of rules that are agreed by at least two communicating parties to communicate with each other through a network such as the LAN or the Internet 112. The simple network management protocol (SNMP) is a protocol, which monitors or controls a communication apparatus connected to the network based on TCP/IP network such as a router, computer, or terminal, through the network.

In the following examples, it is assumed that at least one of the managed apparatuses 10(11) is implemented by a projector capable of communicating with the outside apparatus directly or via the relay apparatus 101.

For the descriptive purposes, it is assumed that the managed apparatus 10 without the relay function is implemented by a projector 10', and the managed apparatus 10 with the relay function is implemented by a projector 11'. Since the projector 10" and the projector 11' are substantially similar in structure and function except for availability of the relay function, the projectors 10' and 11' are assumed to have a hardware structure that is substantially the same as illustrated in FIG. 1. Further, for the descriptive purposes, the projectors 10" and 11" may be collectively referred to as the projector 10(11).

FIG. 1 illustrates a hardware structure of the projector 10(11), and a functional structure implemented by a CPU in a controller board of the projector 10(11), according to an example embodiment of the present invention. The projector 10(11) is capable of projecting an image based on image data onto a projection surface such as a screen.

As illustrated in FIG. 1, the projector 10(11) includes a controller board 200, a hard disk drive (HDD) 201, a nonvolatile RAM (NV-RAM) 202, a personal interface (PI) board 203, a physical medium interface (PHY) 204, an operation panel 205, a projection engine 206, and a power supply unit 207. These units are hardware resources of the projector 10(11).

The controller board 200 is provided with a microcomputer including a CPU, ROM, and RAM. The controller board 200 controls operation of the other units through a peripheral components interconnect-bus (PCI-BUS). The HDD 201 stores therein various data in a manner that is not deleted even when there is not electric power supply from the power supply unit 207.

The NV-RAM 202 is integrated with a backup circuit using a RAM and a battery. The NV-RAM 202 may be alternatively implemented by any desired nonvolatile memory such as EEPROM or flash memory. The NV-RAM 202 stores information regarding a communication task, of which execution can be extended. The RAM of the controller board 200 is a volatile memory, which stores various data in a manner such that data is kept only when electric power supply is supplied from the power supply unit 207.

The PI board 203 and the PHY 204 are each provided with the communication function, which causes the projector 10(11) to communicate with the outside apparatus, and may be implemented by a communication board. The PI board 203 is provided with an interface in compliance with RS485 standards, and is connected to the public line 103 thorough a line adapter. The PHY 204 is an interface, which allows the projector 10(11) to communicate with the outside apparatus through the LAN.

The operation panel 205 includes an input device that allows the user to input an instruction through various operational keys (operational switch or operation buttons), and a display such as a LCD or CRT for displaying information such as characters.

As illustrated in FIG. 1, the projection engine 206 outputs an ENGRDY signal to the controller board 200 to notify the controller board 200 of completion of various initial settings at the projection engine 206 such that the projection engine 206 is ready for transmitting or receiving commands with the controller board 200. The controller board 200 outputs a PWRCTL signal to the power supply unit 207 to control electric power supply from the power supply unit 207 to the projection engine 206.

The projection engine 206 includes a lamp 208, a sensor 209, and a cooling unit 210. The lamp 208 is a light source, which projects an image on the projected surface such as the screen. The sensor 209 includes a temperature detection sensor for detecting temperature of the lamp 208, a time detection sensor for detecting operation time of the lamp 208, and an error detection sensor for detecting an error in the projection engine 206 such as the error in lamp 208 or cooling fan of the cooling unit 210. The cooling unit 210 causes the lamp 208 to cool down by lowering its temperature. For example, the cooling unit 210 may be provided with the cooling fan for lowering the temperature of the lamp 208 by circulating air, or a Peltier device that is provided in close contact with the lamp 208 to lower the temperature of the lamp 208 as electric power is applied. For the descriptive purposes, in this example, it is assumed that the cooling unit 210 includes a cooling fan and a driver that drives the cooling fan.

The power supply unit 207 supplies electric power to various devices in the projector 10(11), such as to the projection engine 206 and the controller board 200.

The CPU of the controller board 200 performs various functions according to control programs loaded onto the RAM. More specifically, the CPU of the projector 10(11) causes the projector 10(11) to have an application module layer and a service module layer.

The application module layer, which is an upper layer, includes various programs, which cause the CPU to function as various application controllers to control the hardware resources of the projector 10(11) to perform specific functions. The service module layer, which is a lower layer, includes various programs, which cause the CPU to function as a service controller that interacts with the hardware resources and various application controllers to perform various operations such as receiving an operation request from the application controllers to the hardware resources, arbitrating the operation request, and controlling execution of the operation request. These programs, i.e., software, are read onto the RAM of the controller board 200 from the HDD 201 for execution by the CPU of the controller board 200.

More specifically, the CPU executes the programs to implement functional modules as illustrated in FIG. 1, which include a system controller 211, a user interface 212, a relay apparatus communication unit 213, and a management apparatus communication unit 214. For example, when executed by the CPU of the controller board 200, the control program loaded onto the RAM causes the CPU to have these functional modules illustrated in FIG. 1.

The system controller 211 controls entire operation of the projector 10(11). In one example, the system controller 211 performs a task execution process to execute a communication task using the relay apparatus communication unit 213 or the management apparatus communication unit 214. In another example, the system controller 211 performs an electric power supply control process that stops electric power supply from the power supply unit 207 after causing the cooling unit 210 to lower the temperature of the lamp 208, when an instruction for turning off the power of the projector 10(11) is received by the user interface 212 through the operation panel 205.

The system controller 211 further controls the activation process or inactivation process of the projector 10 (11), controls the projection engine 206, or controls the NV-RAM 202. The system controller 211 further requests the relay apparatus communication unit 213 or the management apparatus communication unit 214 to send a message. The system controller 211 further interprets a message received from the relay apparatus communication unit 213 or the management apparatus communication unit 214, and controls the hardware resources based on the contents of the message. The system controller 211 further controls the hardware resources based on a request received through the user interface 212.

The projector 10 (11) cools down the lamp 208, which has high temperature, for a predetermined time period, and stops electric power supply to turn off the power. For this reasons, it takes a while to stop electric power supply even when the user instructs the projector 10(11) to turn off the power. In this example, the projector 10(11) stores information regarding one or more communication tasks, which have been requested during the activation process or the projection process, and can be postponed to be processed later. Based on the stored information, the projector 10(11) extends execution of the one or more communication tasks, and executes the postponed communication tasks while cooling down the lamp 208 before turning off the power. This reduces the workload in processing the communication tasks during the activation process or the projection process.

When a request for communication task is received while the projector 10(11) is in operation, the system controller 211 determines whether the communication task being requested can be postponed to be processed later. When it is determined that the communication task cannot be postponed, the system controller 211 executes such communication task. When it is determined that the communication task can be postponed, the system controller 211 stores the communication task in the NV-RAM 202. When a user instruction for turning off the power is received through the user interface 212, the system controller 211 starts cooling down the lamp 208 using the cooling unit 210, and while cooling, executes the communication task stored in the NV-RAM 202.

For example, in order to be managed by the management apparatus 102, the projector 10(11) is programmed to periodically send various information regarding the current operation state of the projector 10(11) to the management apparatus 102. For example, at the time of activating the projector 10(11), the projector 10(11) may send various information regarding one or more devices in the projector 10(11) to the management apparatus 102 in the form of periodic notice data. More specifically, the system controller 211 issues a request for processing a communication task related to periodic notice data when the projector 10(11) is activated to start communications with the management apparatus 102. In response to the request for communication task, the system controller 211 collects various information regarding one or more devices in the projector 10(11), generates contents of the periodic notice data, and transmits the periodic notice data to the management apparatus 102. Based on the received periodic notice data, the management apparatus 102 manages the projector 10(11). This, however, may tend to slow down the activation process of the projector 10(11) such that, in this example, the system controller 211 extends execution of the communication task when the communication task can be postponed at a later time.

In alternative to storing the communication task in the NV-RAM 202, the communication task may be stored in any other desired memory such as the HDD 201.

Now, determination of whether the communication task can be postponed is explained according to an example embodiment of the present invention.

Examples of the communication task that cannot be postponed include a communication task relating to automatic error notice data, which is generated and addressed to the management apparatus 102 when an error is detected on the projector 10(11). The system controller 211 may generate automatic error notice data indicating a "lamp error", "temperature error", "cooling fan error", "projector inner body error", "power-on time memory read error", etc. The automatic error notice data indicating the lamp error is generated by the system controller 211, based on a detection result of the sensor 209, which indicates an error in lighting the lamp 208. The automatic error notice data indicating the temperature error is generated, when a detection result of the sensor 209 that indicates temperature of the projection engine 206 exceeds a predetermined level. Alternatively, the system controller 211 generates the automatic error notice data indicating the temperature error, when a detection result of any other temperature sensor indicates that temperature of the inner body of the projector 10(11) exceeds a predetermined level.

The automatic error notice data indicating the cooling fan error is generated by the system controller 211, based on a detection result of the sensor 209 indicating an error in the cooling unit 210. The automatic error notice data indicating the inner body error is generated by the system controller 211, when the system controller 211 detects an error in any unit of the projector 10(11) based on a detection result of any desired sensor provided in the projector 10(11).

The automatic error notice data indicating the memory read error is generated by the system controller 211, when the system controller 211 detects an error in reading data from a memory such as the RAM of the controller board 200, NV-RAM 202, or HDD 201.

The communication task related to the automatic error notice data, such as transmission or reception of data relating to the automatic error notice data to or from the management apparatus 102 cannot be postponed, as immediate attention may be required.

Examples of the communication task that can be postponed include a communication task relating to periodic notice data, which is periodically generated and addressed to the management apparatus 102. For example, the projector 10(11) may generate the periodic notice data once per day, and transmit the periodic notice data to the management apparatus 102 to be managed by the management apparatus 102.

The periodic notice data may include any information that identifies the projector 10(11) such as a product name of the projector 10(11), a serial number assigned to the projector 10(11), an engine number of the projection engine 206 provided in the projector 10(11), or a number of lamps 208 that are provided in the projector 10(11). The periodic notice data may include any information that identifies software installed onto the projector 10(11) such as a version of software installed onto the ROM of the controller board 200 of the projector 10(11), a version of stand-by software installed onto the ROM of the controller board 200 of the projector 10(11), a version of software installed onto the ROM of a network circuit such as the PI board 203 or PHY 204 of the projector 10(11). The periodic notice data may include any information that is used to authenticate the projector 10(11), such as a digital certificate of the projector 10(11). Using the above-described information specific to the projector 10(11), the management apparatus 102 is able to identify the projector 10(11), or manage firmware or software update of the projector 10(11).

The periodic notice data may include any information relating to usage of the projector 10(11) such as a lamp operation time indicating the total operation time of the lamp 208, a total operation time of the projector 10(11) indicating the accumulated operation time, a total energy-saving mode ("ecomode") lamp operation time indicating the total operation time of the lamp in the ecomode, an estimated reduced $CO_2$ level indicating the difference between the $CO_2$ emission level in the ecomode and the $CO_2$ emission level in the normal operation mode, a lamp reset number indicating a number of resetting the lamp operation time, a remaining lamp operation time when the lamp is operated in the normal operation mode, a remaining lamp operation time when the lamp is operated in the ecomode, an air filter usage time of the projector 10(11), etc. Using the above-described information regarding usage of one or more devices in the projector 10(11), the management apparatus 102 is able to manage supply of the projector 10(11). For example, when any supply needs to be replaced, the management apparatus 102 may automatically send notification to the user through the projector 10(11).

Any information of the periodic notice data may be stored in the NV-RAM 202, for example, in the form of a table. For example, the system controller 211 measures or calculates various parameter values such as the total lamp operation time while the projector 10(11) is in operation, and stores the measured or calculated values in the NV-RAM 202 in the form of table.

In addition to the above-described examples of the communication task that can be postponed, or not postponed, the user may determine whether a specific communication task that may be generated while the projector 10(11) is in operation, can be postponed or not postponed. For example, the user may input a user instruction indicting whether a specific communication task can be postponed or not postponed, while registering the specific communication task that may be processed by the projector 10(11).

Further, in this example, the system controller 211 determines whether execution of a specific communication task can be extended or not extended using information, which may be previously stored in the NV-RAM 202 in the form of a table.

For example, the table of FIG. 5A stores identification information for identifying a specific communication task that may be performed, and the value of execution time extension flag in association with each other. More specifically, in this example, the periodic notice data is a communication task that can be executed at a later time based on the value "TRUE" of execution time extension flag. The automatic error notice data is a communication task that cannot be executed at a later time based on the value "FALSE" of execution time extension flag.

When a request for the communication task related to the periodic notice data is received, the system controller 211 refers to the value "TRUE" of execution time extension flag in the table of FIG. 5A to determine that the communication task related to the periodic notice data can be executed at a later time. Based on this determination, the system controller 211 stores the communication task related to the periodic notice data in the NV-RAM 202, such as a queue, to extend execution of the communication task until the process of cooling the lamp 208 is performed before the power is turned off.

When a request for the communication task related to the automatic error notice data is received, the system controller 211 refers to the value "FALSE" of execution time extension flag in the table of FIG. 5A to determine that the communication task related to the automatic error notice data cannot be executed at a later time. Based on this determination, the system controller 211 executes the communication task related to the automatic error notice data, without postponing execution of the communication task.

The table of FIG. 5A may additionally or alternatively store any other type of communication task, such as a communication task that is requested for registration based on a user instruction, in association with the value of execution time extension flag. For example, when a user instruction for registering a specific communication task is received, the system controller 211 may request the user to input settings information to indicate whether execution of the specific communication task can be extended or not. Based on the settings information input by the user, the system controller 211 stores the value of execution time extension flag in association with the identification information of the specific communication task requested by the user for registration. When a request for the specific communication task that is registered based on the user instruction is received, the system controller 211 refers to the table of FIG. 5A to determine whether to extend execution of the specific communication task or execute the specific communication task.

When the communication task to be processed is stored in the NV-RAM 202, the system controller 211 estimates a first time period required to process all of the communication tasks stored in the NV-RAM 202, and a second time period required for the cooling unit 210 to cool down the lamp 208. When the estimated value of first time period exceeds the estimated value of second time period, the system controller 211 selects one or more communication tasks from the communication tasks stored in the NV-RAM 202 according to a predetermined rule, and executes the selected communication tasks to reduce a number of communication tasks to be performed during the process of cooling down the lamp 208. The number of communication tasks to be executed, or to be reduced, is determined such that the estimated first time period does not exceed the estimated second time period.

In this example, the NV-RAM 202 previously stores information indicating an estimated time period for each one of communication tasks that may be processed by the projector 10(11). For example, in the above-described case referring to FIG. 5A, the NV-RAM 202 additionally includes a table storing an estimated time period required for processing the communication task related to the periodic notice data, an estimated time period required for processing the automatic error notice data, and an estimated time period required for processing any other communication task registered by the user. The estimated time period for processing a specific communication task is a total time period, which may be counted from the time when the contents of a communication request (response) is generated, to the time when the communication request (response) is transmitted. The system controller 211 may refer to the stored information regarding the estimated time period to obtain the value of first time period.

Further, in this example, the NV-RAM 202 previously stores information indicating an estimated time period required for cooling down the lamp 208. For example, a cooling time period required for cooling down the lamp 208 to a predetermined temperature is previously measured for each one of various temperature values of the lamp 208 by experiment to generate sample data. The sample data is used to generate a table indicating association between the temperature of the lamp 208 before being cooled down to the predetermined temperature, and the time required for cooling down the lamp 208 to the predetermined temperature. The system controller 211 refers to the table to obtain the estimated second time period, which is stored in association with the detected temperature of the lamp 208.

Alternatively, the system controller 211 may obtain the estimated first time period and the estimated second time period, based on a weighted value ("weight") of the communication task that is estimated based on the processing capability of the projector 10(11) in performing the communication task. For example, task processing capability such as the workload on the CPU or the workload relating to communications in performing a specific communication task is previously obtained for the projector 10(11). Using the task processing capability of the projector 10(11), a weighted value indicating a time period required for processing a specific communication task is obtained, for example, for each one of the communication task related to the periodic notice data, the communication task related to the automatic error notice data, and the communication task registered by the user. For example, as illustrated in FIG. 5B, the NV-RAM 202 stores a table storing a weighted value (weight) in association with identification information of the communication task. The table of FIG. 5B may be referred to by the system controller 211 to obtain the estimated first time period.

For example, in the example case illustrated in FIG. 5B, the table stores a weight value "50" for the communication task related to the periodic notice data, and a weight value "3" for the communication task related to the automatic error notice data. The communication task related to the periodic notice data having the higher weight value requires more processing time than the communication task related to the automatic error notice data.

Further, the NV-RAM 202 may previously store a weight value indicating a time period required for cooling down the lamp 208 based on cooling down processing capability of the projector 10(11). The weight value may be referred to by the system controller 211 to obtain the estimated second time period. For example, the NV-RAM 202 may include a table storing a plurality of weight values in association with a plurality of lamp temperature values or lighting time periods.

As described above, the system controller 211 reduces a number of communication tasks to be processed later such that the estimated first time period is equal to or less than the estimated second time period, for example, by executing one or more communication tasks that are selected according to the predetermined rule. For example, the system controller 211 may execute the communication task according to a task priority level that is previously assigned to each communication task.

For example, as illustrated in FIG. 5C, the NV-RAM 202 includes a table, which stores a task priority level "5" for the communication task related to the periodic notice data "1", and a task priority level "9" for the communication task related to the periodic notice data "2". The system controller 211 may refer to the table of FIG. 5C to select one or more communication tasks to be executed based on the task priority level.

In the above-described example, it is assumed that the system controller 211 stores one or more communication tasks, which can be processed later, in the NV-RAM 202, and estimates the first time period and the second time period. Alternatively, the system controller 211 may estimate the first time period and the second time period to determine whether to extend execution of a specific communication task, before storing the specific communication task in the NV-RAM 202. When the estimated first time period will exceed the estimated second time period after adding the time period required for processing the specific communication task, the system controller 211 executes the specific communication task without storing the specific communication task in the NV-RAM 202. When the estimated first time period does not exceed the estimated second time period after adding the time period required for processing the specific communication task, the system controller 211 stores the specific communication task in the NV-RAM 202 to be processed later.

The user interface 212 controls input or output with respect to the operation panel 205. For example, the user interface 212 receives various user instructions from the user, such as a user instruction for turning on the power of the projector 10(11), a user instruction for turning off the power of the projector 10(11), and a user instruction for setting various parameters. The user interface 212 sends the user instruction, or any data input with the user instruction, to the system controller 211.

The relay apparatus communication unit 213 receives a request from the system controller 211, and sends a message relating to the received request to the relay apparatus 101. The relay apparatus communication unit 213 may receive a message that is generated at the relay apparatus 101 in response to the message transmitted to the relay apparatus 101, from the relay apparatus 101.

The management apparatus communication unit 214 receives a request from the system controller 211, and sends a message relating to the received request to the management apparatus 102. The management apparatus communication unit 214 may receive a message that is generated at the management apparatus 102 in response to the message transmitted to the management apparatus 102, from the management apparatus 102.

As described above, the projector 10 and the projector 11 communicate with the management apparatus 102 in different ways. The projector 11, which is provided with the function of the relay apparatus 101, directly communicates with the management apparatus 102 by executing the communication program using the CPU. The projector 10, which is not provided with the relay function, communicates with the management apparatus 102 via the relay apparatus 101 by executing the communication program using the CPU.

Referring now to FIG. 6, operation of determining when to process a request for communication task that is received while the projector 10(11) is in operation, performed by the projector 10(11), is explained according to an example embodiment of the present invention. The operation of FIG. 6 may be performed when the system controller 211, which monitors for any request, detects a request for communication task.

As described above referring to FIGS. 1 and 5A to 5C, the communication task may be a communication task related to periodic notice data that may be requested during the activation process or the projection process, a communication task related to automatic error notice data that is generated when an error is detected, or a communication task generated by the user. The request for communication task related to periodic notice data may be generated by a periodic notice processing program, which operates under control of the system controller 211. The request for communication task related to automatic error notice data may be generated by an error processing program, which operates under control of the system controller 211. The request for communication task generated by the user may be generated using application program that operates under control of the system controller 211.

At S1, the system controller 211 determines whether execution of the communication task that is requested ("the requested communication task") can be extended. When it is determined that execution of the requested communication task can be extended ("YES" at S1), the operation proceeds to S2. When it is determined that execution of the requested communication task cannot be extended ("NO" at S1), the operation proceeds to S6. The system controller 211 may refer to the table of FIG. 5A to determine whether execution of the requested communication task can be extended, based on the flag value.

For example, in this example illustrated in FIG. 5A, when the requested communication task is a communication task related to periodic notice data, or a communication task that the user sets as extendable, the operation proceeds to S2. When the requested communication task is a communication task related to automatic error notice data, or a communication task that the user sets as non-extendable, the operation proceeds to S6.

At S2, the system controller 211 stores the requested communication task in the NV-RAM 202.

At S3, the system controller 211 obtains the estimated first time period and the estimated second time period. As described above, the estimated first time period is a time period required for processing all of the one or more communication tasks stored in the NV-RAM 202, including the time for processing the requested communication task stored at S2. The estimated second time period is a time period required for cooling down the lamp 208 using the cooling unit 210.

At S4, the system controller 211 determines whether the estimated value of first time period exceeds the estimated value of second time period. When it is determined that the estimated value of first time period exceeds the estimated value of second time period ("YES" at S4), the operation proceeds to S5. When it is determined that the estimated value of first time period does not exceed the estimated value of second time period ("NO" at S4), the operation ends.

At S5, the system controller 211 selects one or more communication tasks, from the NV-RAM 202 to execute the selected communication tasks, thus reducing a number of communication tasks to be processed later, i.e., the estimated first time period. As described above referring to FIG. 5C, the system controller 211 selects one or more communication tasks to be executed, based on the task priority level such that the communication task having the higher priority level is executed. In this manner, the number of communication tasks to be processed later is controlled to be within a number of communication tasks that can be processed while cooling down the lamp 208 when an instruction for turning off the power is received. Accordingly, electric power supply is shut down when or after all of the communication tasks to be performed are executed, before the power of the projector 10(11) is turned off. More specifically, at S5, the system controller 211 executes one or more communication tasks, until the estimated first time period is equal to or less than the estimated second time period.

At S6, the system controller 211 executes the requested communication task, which cannot be postponed, without storing the requested communication task in the NV-RAM 202, and the operation ends.

As described above, when a request for specific communication task is received while the projector 10(11) is in operation, the projector 10(11) does not execute the communication task if execution of the communication task can be extended, but stores the communication task in the memory for later processing. The stored communication task is later processed while the projector 10(11) is cooling down the lamp 208 before the power of the projector 10(11) is turned off. This reduces the time required for activating the projector 10(11), or the processing load when the projector 10 performs image projection.

The above-described steps S3 to S5 may be performed right after performing S2. Alternatively, S3 to S5 may be performed when processing load on the projector 10(11) is relatively low, for example, when the projector 10(11) is not processing an image for projection, or not in the middle of being activated. This further reduces the processing load on the projector 10(11).

Figure 7:
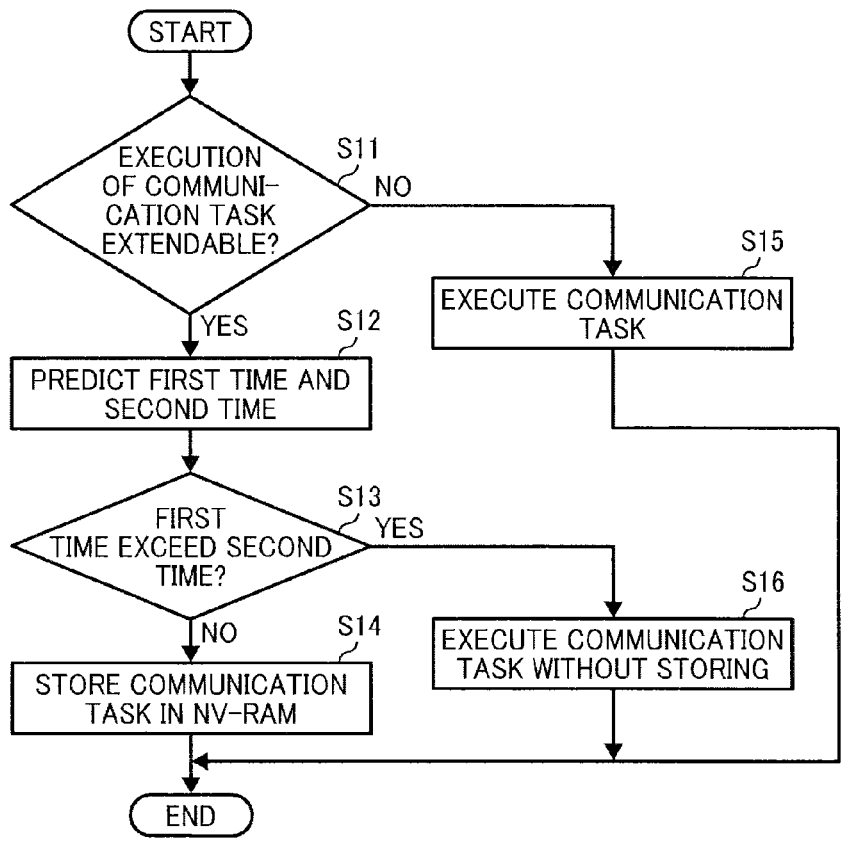
FIG. 7 is a flowchart illustrating operation of processing a communication task, performed by the projector of FIG. 1, according to an example embodiment of the present invention.

Referring now to FIG. 7, operation of determining when to process a request for communication task that is received while the projector 10(11) is in operation, performed by the projector 10(11), is explained according to an example embodiment of the present invention. The operation of FIG. 7 may be performed when the system controller 211, which monitors for any request, detects a request for communication task.

In the example illustrated in FIG. 6, the system controller 211 stores the communication task, which is extendable, before determining whether the estimated first time period exceeds the estimated second time period. In this example illustrated in FIG. 7, the system controller 211 determines whether the estimated first time period exceeds the estimated second time period, before storing the communication task that is extendable.

At S11, the system controller 211 determines whether execution of the requested communication task can be extended. When it is determined that execution of the requested communication task can be extended ("YES" at S11), the operation proceeds to S12. When it is determined that execution of the requested communication task cannot be extended ("NO" at S11), the operation proceeds to S15. The system controller 211 may refer to the table of FIG. 5A to determine whether execution of the requested communication task can be extended, based on the flag value.

For example, in this example illustrated in FIG. 5A, when the requested communication task is a communication task related to periodic notice data, or a communication task that the user sets as extendable, the operation proceeds to S12. When the requested communication task is a communication task related to automatic error notice data, or a communication task that the user sets as non-extendable, the operation proceeds to S15.

At S12, the system controller 211 obtains the estimated first time period and the estimated second time period. In this example, the estimated first time period is a time period required for processing all of the one or more communication tasks stored in the NV-RAM 202 and the requested communication task that is received. The estimated second time period is a time period required for cooling down the lamp 208 using the cooling unit 210.

At S13, the system controller 211 determines whether the estimated value of first time period exceeds the estimated value of second time period. When it is determined that the estimated value of first time period exceeds the estimated value of second time period ("YES" at S13), the operation proceeds to S16. When it is determined that the estimated value of first time period does not exceed the estimated value of second time period ("NO" at S13), the operation proceeds to S14.

At S14, the system controller 211 stores the requested communication task in the NV-RAM 202 to be processed later, and the operation ends.

At S15, the system controller 211 executes the requested communication task without storing the requested communication task in the NV-RAM 202, and the operation ends.

At S16, the system controller 211 executes the requested communication task without storing the requested communication task in the NV-RAM 202, and the operation ends.

As described above referring to FIG. 7, the system controller 211 does not store the requested communication task when the estimated first time period will exceed the estimated second timer period after storing the requested communication task, such that a memory area of the NV-RAM 202 is effectively used. For example, instead of using the memory area for storing the communication task to be soon executed, the memory area may be used as a work memory of executing other processing or as a memory space for storing other data. Further, processing load on the system controller 211 may be reduced.

In the above-described example referring to FIGS. 6 and 7, one or more communication tasks to be stored in the NV-RAM 202 for later processing are adjusted so that the estimated first time period does not exceed the estimated second time period. However, if there is a large number of communication tasks to be later processed, the overall time period required for processing the communication tasks tends to exceed the time period required for cooling down the lamp 208. In view of this, an upper limit may be set for the number of communication tasks to be stored in the NV-RAM 202 to keep the number of communication tasks to be within the upper limit.

Further, when the projector 10(11) sends a large number of communication requests or responses at once to the relay apparatus 101 or the management apparatus 102 (the outside apparatus), the outside apparatus may not be able to process a large number of communication tasks. Further, the outside apparatus may be programmed to reject a large number of communication tasks to protect from a potential attack. For this reasons, a number of communication requests or responses to be transmitted to the outside apparatus at once may be limited, for example, at 5. In such case, a number of communication tasks to be stored in the NV-RAM 202 has to be within the total number of communication tasks that can be accepted by the outside apparatus.

The NV-RAM 202 may store information indicating the upper limit of communication tasks to be stored in the NV-RAM 202. The system controller 211 may periodically refer to a number of communication tasks currently stored in the NV-RAM 202, and to the information indicating the upper limit of communication tasks that can be stored in the NV-RAM 202. When the number of communication tasks currently stored exceeds the upper limit, the system controller 211 selects one or more communication tasks according to a predetermined rule to execute the selected communication tasks, thus keeping a number of communication tasks to be within the upper limit.

Further, when a request for communication task that can be extended is received, the system controller 211 may obtain a number of communication tasks currently stored in the NV-RAM 202 before storing the received communication task. The system controller 211 further refers to the upper limit of the communication tasks that is stored in the NV-RAM 202, and determines whether the total number of communication tasks currently stored and the received communication task exceeds the upper limit. When the total number of communication tasks exceeds the upper limit, the system controller 211 determines that storing the received communication task results in the total number of communication tasks to exceed the upper limit. Based on this determination, the system controller 211 executes the received communication task without storing the communication task in the NV-RAM 202.

Further, the system controller 211 may perform the operation of FIG. 6 or the operation of FIG. 7 interchangeably. For example, the system controller 211 may switch between the operation of FIG. 6 and the operation of FIG. 7 according to a user instruction for switching, which may be received through the operation panel 205.

Figure 8:
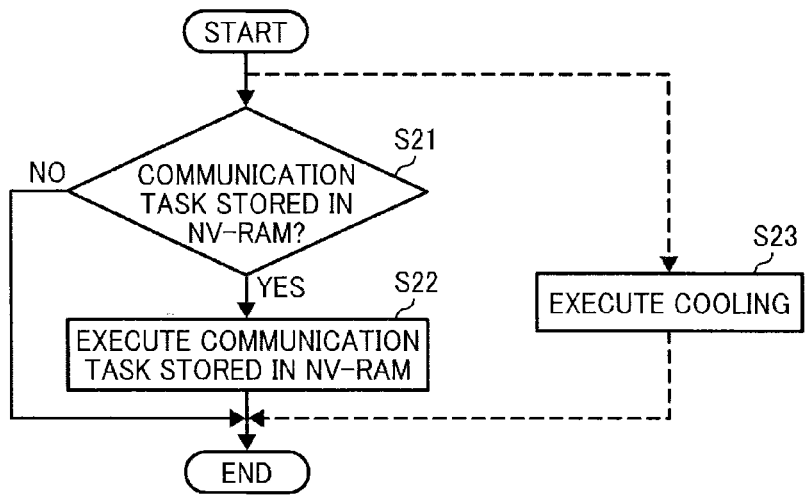
FIG. 8 is a flowchart illustrating operation of processing an instruction for turning off the power of the projector, performed by the projector of FIG. 1, according to an example embodiment of the present invention.

Referring now to FIG. 8, operation of processing a user instruction for turning off the power of the projector 10(11), performed by the system controller 211, is explained according to an example embodiment of the present invention. The operation of FIG. 8 is performed by the system controller 211, which monitors for any request, when the system controller 211 detects a user instruction for turning off the power of the projector 10(11). For example, when the system controller 211 detects selection of the power switch of the operation panel 205 through the user interface 212, the system controller 211 determines that the user instruction for turning off the power is received.

In this example, S21 and S22, and S23 of cooling down are performed concurrently. This concurrent processing is indicated by dashed line in FIG. 8.

At S23, the cooling unit 210 of the projection engine 206 cools down the lamp 208 for a predetermined time period, or until the detected lamp temperature reaches a predetermined value. In case the cooling unit 210 cools down the lamp 208 until the detected temperature reaches the predetermined value, the sensor 209 constantly measures the temperature of the lamp 208 to output the detected temperature value. The predetermined time period, or the predetermined temperature value, may be previously set, for example, by experiment such that the lamp 208 is kept from being damaged even when electric power supply is shut down.

At S21, the system controller 211 determines whether there is any communication task stored in the NV-RAM for processing. When it is determined that there is no communication task stored ("NO" at S21), the operation ends while waiting for S23 to be completed. When it is determined that there is at least one communication task stored ("YES" at S21), the operation proceeds to S22.

At S22, the system controller 211 executes the communication task stored in the NV-RAM, and the operation ends while waiting for S23 to be completed.

When the operation ends, the system controller 211 sends an instruction for stopping electric power supply to the power supply unit 207, thus turning off the power of the projector (10)11.

As described above, the projector (10)11 does not usually perform processing other than cooling down the lamp 208 when the instruction for turning off the power is received. The system controller 211 is thus able to perform one or more communication tasks that are determined to be processed later. Since a number of communication tasks being executed when the projector 10(11) performs activation or projection processing can be reduced, the time required for activating the projector 10(11) and/or the processing load on the projector 10(11) during the projection processing can be greatly reduced. This further allows effective use of the time required for cooling down the lamp 208.

Further, as described above, even though execution of the communication task can be extended, the communication task may require processing time that is longer than the processing time required for cooling down the lamp 208. In such case, the communication task may not be completed if the electric power is turned off after completion of the process of cooling down the lamp 208. In alternative to or in addition to adjusting a number of communication tasks to be processed later, the system controller 211 may determine to partly process the communication task. For example, it may require longer processing time to generate contents of a communication request or response, while it may require less processing time to just transmit or receive the communication request or response. In such case, even when execution of the communication task can be extended, the system controller 211 may generate contents of the communication request or response, and store the contents of the communication request or response in the NV-RAM 202 to be transmitted later. When the user instruction for turning off the power is received, the system controller 211 reads outs the contents of the communication request or response from the NV-RAM 202, and transmits the contents of the communication request or response to complete the communication task. In this manner, the communication task can be processed when or before the process of cooling down is completed.

Figure 9:
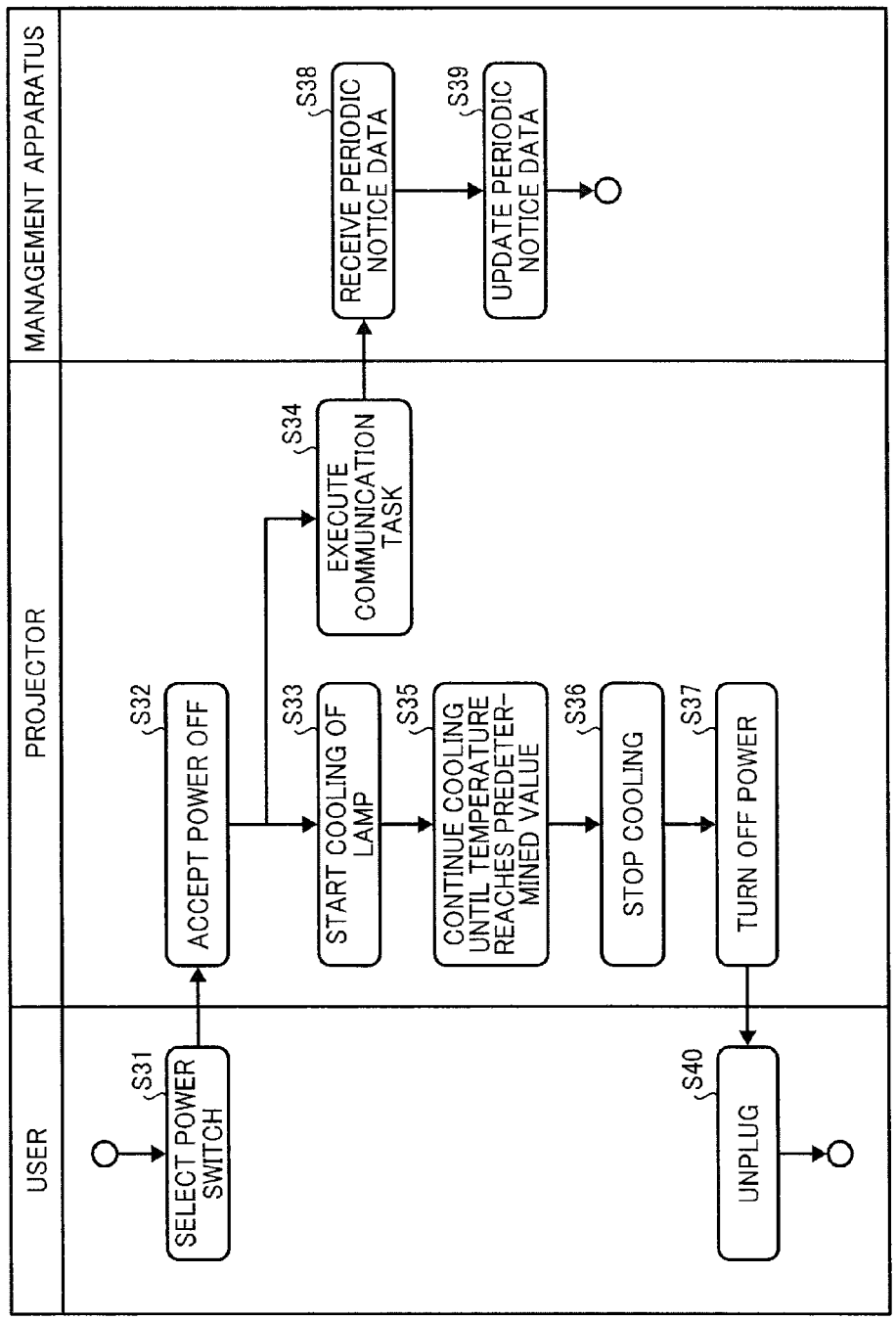
FIG. 9 is a data sequence diagram illustrating operation of processing a communication task when an instruction for turning off the power of the projector is received, performed by the communication management system of FIG. 2, according to an example embodiment of the present invention.

FIG. 9 is a data sequence diagram illustrating operation of executing a communication task for the management apparatus 102 when the user instruction for turning off the power is received, performed by the projector 11, according to an example embodiment of the present invention.

At S31, the user selects the power switch of the operation panel 205 of the projector 11 to input a user instruction for turning off the power of the projector 11. At S32, the system controller 211 of the projector 11 accepts a user instruction for turning off the power, based on notification received from the user interface 212.

At S33, the system controller 211 of the projector 11 drives the cooling unit 210 of the projection engine 206 to start cooling down the lamp 208. Concurrently, at S34, the system controller 211 of the projector 11 executes one or more communication tasks that are stored in the NV-RAM 202. More specifically, the system controller 211 generates contents of data to be transmitted to the management apparatus 34, and starts transmitting data to the management apparatus 34.

In this example, it is assumed that a time period required for completing the cooling process is sufficiently longer than a time period required by the projector 11 to complete the communication task. Further, S33 of cooling process and S34 of generating and transmitting data to the management apparatus 102 are performed concurrently.

For example, assuming that the communication task related to periodic notice data is executed, various data relating to the projector 11 such as a machine number for identifying the projector 11, a digital certificate for authenticating the projector 11, error data indicating an error detected at the projector 11, the total operation time of the projector 11 such as the operation time of the lamp 208, and usage time of consumable parts (such as lamp or air filter), etc. are obtained as data to be transmitted.

At S38, the management apparatus 102 receives the data, such as the periodic notice data, from the projector 11. At S39, the management apparatus 102 updates periodic notice data, which is previously stored for the projector 11, with the received periodic notice data.

At S35, the projector 11 continues to cool down the lamp 208, for example, until its temperature reaches a predetermined temperature value. When it is determined that the detected lamp temperature reaches the predetermined temperature value, at S36, the system controller 211 stops driving the cooling unit 210 to end the cooling process. At S37, the system controller 211 instructs the power supply unit 207 to shut down electric power supply to turn off the power of the projector 11.

At S40, the user may then safely unplug the projector 11, for example, when the user detects that there is no sounds of cooling fan or when the user sees a message indicating that the power is off on the operation panel 205.

For example, the system controller 211 may predict the time when the power of the projector 11 will be turned off, based on the estimated time period required for cooling down the lamp 208. Based on this predicted time, the system controller 211 may display a message indicating that the power is turned off to the user through the operation panel 205. Further, based on this predicted time, the system controller 211 of the projector 11 may send notification indicating that the power is turned off, to the management apparatus 102. With this notification, the management apparatus 102 is able to know that the projector 11 is turned off in realtime.

While the operation of FIG. 9 is described using the example case of the projector 11 with the relay function, the operation of FIG. 9 may be performed in a substantially similar manner in the example case of the projector 10 except that the projector 10 communicates with the management apparatus 102 via the relay apparatus 101.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, any desired type of projector may be used as the projector 10(11), which may be portable. The address of the projector may be changed, depending on the site at which the projector is provided.

The communication tasks that are stored to be later processed may be executed at any desired time other than the time when the user instruction for turning off the power of the projector is received. For example, assuming that the projector is provided with a web user interface, the projector may execute the communication task that is postponed, when an instruction for disconnecting or logging off from the network through the web user interface is received. In another example, assuming that the projector is provided with the network protocol management function, the projector may perform execution of the communication task that is postponed, when an instruction for ending communication using a specific network protocol is received through specific application. Alternatively, assuming that the projector is provided with a timer function, the projector may perform execution of the communication task that is postponed, when a current time reaches a timer value that is previously registered by the user or set by default.

Further, any one of the above-described hardware or functional structures of the managed apparatus 10, managed apparatus 11, relay apparatus 101, and management apparatus 102, type of processing to be performed by the managed apparatus 10, managed apparatus 11, relay apparatus 101, or management apparatus 102, estimated first time period, estimated second time period, periodic notice data, automatic error notice data, the cooling unit 208 provided with a driver for driving a cooling fan, operation to be performed by the managed apparatus 10 before turning off the power, a predetermined value or rule to be used for selection of a communication task to be performed, a format of data, or a format of table, may be implemented in various other ways.

Further, in alternative to implementing any one of the above-described functions or operations to the projector, any one of the above-described functions or operations may be implemented to any communication apparatus provided with the function of communicating with the outside apparatus, and the function of stopping electric power supply after causing a specific driver to perform specific operation when an instruction for turning off the power is received.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a communication apparatus including: task executing means for executing a communication task using communication means for communicating with the outside apparatus; electric power supply controlling means for stopping electric power supply after causing specific driving means to perform specific operation when an instruction for turning off the power of the communication apparatus is received; determining means for determining, when a request for the communication task is received, whether execution of the requested communication task can be extended to generate a determination result; and task controlling means for controlling the task executing means based on the determination result. The task controlling means causes the task executing means to execute the requested communication task when the determination result indicates that execution of the requested communication task cannot be extended. When the determination result indicates that execution of the requested communication task can be extended, the task controlling means stores the requested communication task in storing means, and causes the task executing means to execute the requested communication task being stored in the storing means at a later time during when the specific drive means performs the specific operation as the instruction for turning off the power of the communication apparatus is received.

For example, the task executing means, the determining means, and the task controlling means correspond to the system controller 211. The communication means corresponds to the relay apparatus communication unit 213 or the management apparatus communication unit 214. The electric power supply controlling means corresponds to the system controller 211, which operates in cooperation with the power supply unit 207. The specific driving means corresponds to the cooling unit 210 of the projection engine 206. The specific operation corresponds to the cooling process, which is performed by the cooling unit 210 to lower temperature of the lamp 208. The storing means corresponds to a memory such as the NV-RAM 202.

When the requested communication task is stored in the storing means, the task controlling means estimates a first time period required by the task executing means in completing all of the communication tasks stored in the storing means, and a second time period required by the specific drive means in performing the specific operation. When it is determined that the estimated first time period exceeds the estimated second time period, the task controlling means causes the task executing means to execute one or more communication tasks that are selected from the communication tasks stored in the storing means according to a predetermined rule, so as to reduce a number of communication tasks being stored in the storing means such that the estimated first time period does not exceed the estimated second time period.

Before storing the requested communication task, the task controlling means estimates a first time period required by the task executing means in completing all of the communication tasks stored in the storing means and the requested communication task, and a second time period required by the specific drive means in performing the specific operation. When it is determined that the estimated first time period exceeds the estimated second time period, the task controlling means causes the task executing means to execute the requested communication task without storing the requested communication task.

When the requested communication task is stored in the storing means, the task controlling means determines whether the total number of communication tasks being stored in the storing means exceeds an upper limit. When it is determined that the total number of communication tasks exceeds the upper limit, the task controlling means causes the task executing means to execute one or more communication tasks that are selected from the communication tasks stored in the storing means according to a predetermined rule, so as to reduce a number of communication tasks being stored in the storing means to be equal to or less than the upper limit.

Before storing the requested communication task, the task controlling means determines whether the total number of communication tasks being stored in the storing means and the requested communication task exceeds an upper limit. When it is determined that the total number of communication tasks exceeds the upper limit, the task controlling means causes the task executing means to execute the requested communication task without storing the requested communication task in the storing means.

In one example, the present invention may reside in a non-transitory recording medium storing a plurality of instructions which, when executed by a processor, cause the processor to perform a method of controlling a communication apparatus. The method includes: executing a requested communication task, the requested communication task including transmission or reception of data with the outside apparatus; performing specific operation using specific driving means when an instruction for turning off the power of the communication apparatus is received; stopping electric power supply when or after the step of performing the specific operation is completed; determining whether execution of the requested communication task can be extended to generate a determination result; and controlling the step of executing based on the determination result, wherein when the determination result indicates that execution of the requested communication task cannot be extended, the step of controlling causes the step of executing the requested communication task to be performed immediately, and when the determination result indicates that execution of the requested communication task can be extended, the step of controlling causes the step of executing the requested communication task to be extended to a later time, such that the step of executing the requested communication task is to be performed during when the step of performing the specific operation is being performed.

In one example, the present invention may reside in a communication management system including a communication apparatus, and a management apparatus that manages the communication apparatus through a network. The communication apparatus includes: a cooling unit to perform a cooling process to lower a temperature of a light source when an instruction for turning off the power of the communication apparatus is received; an electric power supply unit configured to stop supplying electric power to at least the cooling unit when or after the cooling unit completes the cooling process; and a processor configured to monitor a request for communication task while the communication apparatus is in operation, and when the requested communication task is detected, determine whether execution of the requested communication task can be extended to generate a determination result, the requested communication task including transmission or reception of data with the outside apparatus. When the determination result indicates that execution of the requested communication task cannot be extended, the processor executes the requested communication task, and when the determination result indicates that execution of the requested communication task can be extended, the processor extends execution of the requested communication task to a later time, such that the requested communication task is to be executed during when the cooling unit performs the cooling process when the instruction for turning off the power of the communication apparatus is received. The communication apparatus may communicate with the management apparatus, either directly or via a relay apparatus.

What is claimed is:

1. A communication apparatus, comprising:
   a cooling unit to perform a cooling process to lower a temperature of a light source when an instruction for turning off the power of the communication apparatus is received;
   an electric power supply unit configured to stop supplying electric power to at least the cooling unit when or after the cooling unit completes the cooling process; and
   a processor configured to monitor a request for communication task while the communication apparatus is in operation, and when the requested communication task is detected, determine whether execution of the requested communication task can be extended to generate a determination result, the requested communication task including transmission or reception of data with an outside apparatus, wherein
   when the determination result indicates that execution of the requested communication task cannot be extended, the processor executes the requested communication task, and
   when the determination result indicates that execution of the requested communication task can be extended, the processor extends execution of the requested communication task to a later time, such that the requested communication task is to be executed during when the cooling unit performs the cooling process when the instruction for turning off the power of the communication apparatus is received.

2. The communication apparatus of claim 1, further comprising:
   a memory configured to store the requested communication task in addition to one or more communication tasks previously stored to be processed at the later time, when the determination result indicates that execution of the requested communication task can be extended, wherein the processor is further configured to:
   estimate a first time period required by the processor in executing all of the communication tasks stored in the memory, and a second time period required by the cooling unit in completing the cooling process, and
   when the estimated first time period exceeds the estimated second time period, the processor executes one or more communication tasks that are selected from the communication tasks stored in the memory, so as to reduce a number of communication tasks being stored in the memory such that the estimated first time period does not exceed the estimated second time period.

3. The communication apparatus of claim 2, wherein
   the processor selects one or more communication tasks to be executed from the communication tasks stored in the memory, according to a priority level assigned to each one of the communication tasks stored in the memory.

4. The communication apparatus of claim 1, further comprising:
   a memory configured to previously store one or more communication tasks to be processed at the later time, wherein the processor is further configured to:
   estimate a first time period required by the processor in executing all of the communication tasks stored in the memory and the requested communication task, and a second time period required by the cooling unit in completing the cooling process, and
   when the estimated first time period exceeds the estimated second time period, the processor executes the requested communication task without storing the requested communication task in the memory.

5. The communication apparatus of claim 1, further comprising:
   a memory configured to store the requested communication task in addition to one or more communication tasks previously stored to be processed at the later time, when the determination result indicates that execution of the requested communication task can be extended, wherein the processor is further configure to:

determine whether a total number of the communication tasks being stored in the memory exceeds an upper limit, and when the total number of the communication tasks exceeds the upper limit, the processor executes one or more communication tasks that are selected from the communication tasks stored in the memory, so as to reduce a number of communication tasks being stored in the memory to be equal to or less than the upper limit.

6. The communication apparatus of claim 1, further comprising:

a memory configured to previously store one or more communication tasks to be processed at the later time, wherein the processor is further configured to:

determine whether a total number of the communication tasks being stored in the memory and the requested communication task exceeds an upper limit, and when the total number of the communication tasks exceeds the upper limit, the processor executes the requested communication task without storing the requested communication task in the memory.

7. The communication apparatus of claim 1, wherein when the requested communication task is a communication task related to periodic notice data, which is scheduled to be periodically transmitted to the outside apparatus, the processor determines that execution of the requested communication task can be extended, and when the requested communication task is a communication task related to automatic error notice data, which is automatically generated at the communication apparatus when an error is detected, the processor determines that execution of the requested communication task cannot be extended.

8. A communication apparatus, comprising:

task executing means for executing a communication task using communication means for communicating with an outside apparatus;

electric power supply controlling means for stopping electric power supply after causing specific driving means to perform specific operation when an instruction for turning off the power of the communication apparatus is received;

determining means for determining, when a request for communication task is detected, whether execution of the requested communication task can be extended to generate a determination result; and task controlling means for controlling the task executing means based on the determination result, wherein, when the determination result indicates that execution of the requested communication task cannot be extended, the task controlling means causes the task executing means to execute the requested communication task, and when the determination result indicates that execution of the requested communication task can be extended, the task controlling means causes the task executing means to extend execution of the requested communication task to a later time, such that the requested communication task is to be executed during when the specific driving means performs the specific operation when the instruction for turning off the power of the communication apparatus is received.

9. A method of controlling a communication apparatus, comprising:

executing a requested communication task, the requested communication task including transmission or reception of data with an outside apparatus;

performing specific operation using specific driving means when an instruction for turning off power of the communication apparatus is received;

stopping electric power supply when or after the step of performing the specific operation is completed;

determining whether execution of the requested communication task can be extended to generate a determination result; and controlling the step of executing based on the determination result, wherein when the determination result indicates that execution of the requested communication task cannot be extended, the step of controlling causes the step of executing the requested communication task to be performed immediately, and when the determination result indicates that execution of the requested communication task can be extended, the step of controlling causes the step of executing the requested communication task to be extended to a later time, such that the step of executing the requested communication task is to be performed during when the step of performing the specific operation is being performed.

10. The method of claim 9, further comprising:

storing the requested communication task in a memory in addition to one or more communication tasks previously stored to be processed at the later time, when the determination result indicates that execution of the requested communication task can be extended;

estimating a first time period required for executing all of the communication tasks stored in the memory, and a second time period required for completing the step of performing the specific operation;

determining whether the estimated first time period exceeds the estimated second time period; and executing one or more communication tasks that are selected from the communication tasks stored in the memory when the estimated first time period exceeds the estimated second time period, so as to reduce a number of communication tasks being stored in the memory such that the estimated first time period does not exceed the estimated second time period.

11. The method of claim 9, further comprising:

storing one or more communication tasks to be processed at the later time in a memory;

estimating a first time period required for executing all of the communication tasks stored in the memory and the requested communication task, and a second time period required for completing the step of performing the specific operation;

determining whether the estimated first time period exceeds the estimated second time period; and executing the requested communication task without storing the requested communication task in the memory, when the estimated first time period exceeds the estimated second time period.

12. The method of claim 9, further comprising:

storing the requested communication task in a memory in addition to one or more communication tasks previously stored to be processed at the later time, when the determination result indicates that execution of the requested communication task can be extended;

determining whether a total number of the communication tasks being stored in the memory exceeds an upper limit; and executing one or more communication tasks that are selected from the communication tasks stored in the memory, when the total number of the communication tasks exceeds the upper limit, so as to reduce a number of communication tasks being stored in the memory to be equal to or less than the upper limit.

13. The method of claim 9, further comprising:

storing one or more communication tasks to be processed at the later time in a memory;

determining whether a total number of the communication tasks being stored in the memory and the requested communication task exceeds an upper limit; and executing the requested communication task without storing the requested communication task in the memory, when the total number of the communication tasks exceeds the upper limit.

* * * * *